United States Patent [19]

Moye

[11] 4,023,632

[45] May 17, 1977

[54] PNEUMATIC TRANSFER SWITCH FOR BATCH WEIGHING

[75] Inventor: Vergil M. Moye, Dublin, Va.

[73] Assignee: The United States of America as represented by the Secretary of the Army, Washington, D.C.

[22] Filed: June 24, 1976

[21] Appl. No.: 699,569

[52] U.S. Cl. .................................... 177/70; 177/123
[51] Int. Cl.² ................. G01G 19/22; G01G 13/02
[58] Field of Search ............................ 177/70, 123

[56] References Cited
UNITED STATES PATENTS 3,343,616  9/1967  Fellows ............................... 177/70

Primary Examiner—George H. Miller, Jr.
Attorney, Agent, or Firm—Nathan Edelberg; A. Victor Erkkila; Max Yarmovsky

[57] ABSTRACT

A pneumatic transfer switching apparatus utilizes movable and stationary discs having ground, drilled, and grooved faces biasedly held against each other and in axial alignment to permit operation and repositioning of rotatably held scale cut-off pneumatic sensor elements, while maintaining continuation of pneumatic flow paths to the sensors without requiring the use of flexible pneumatic hoses.

5 Claims, 3 Drawing Figures

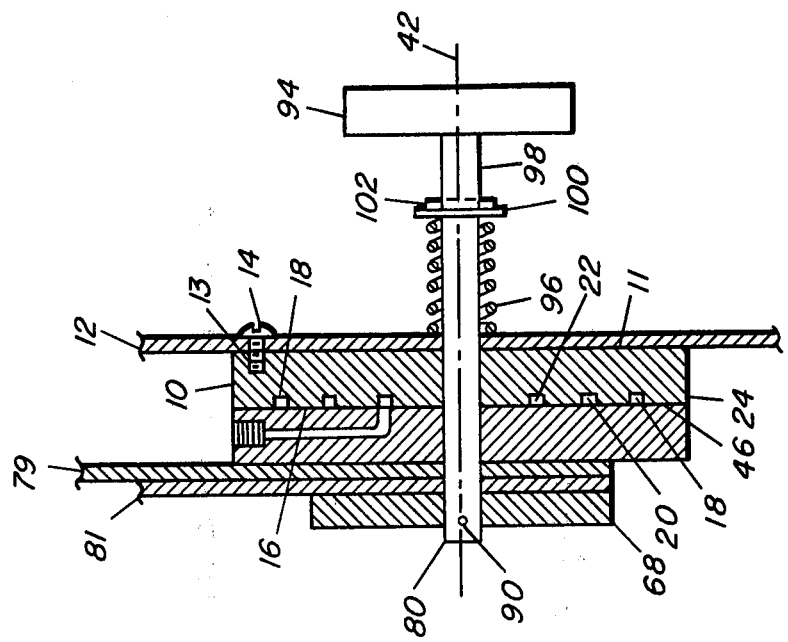
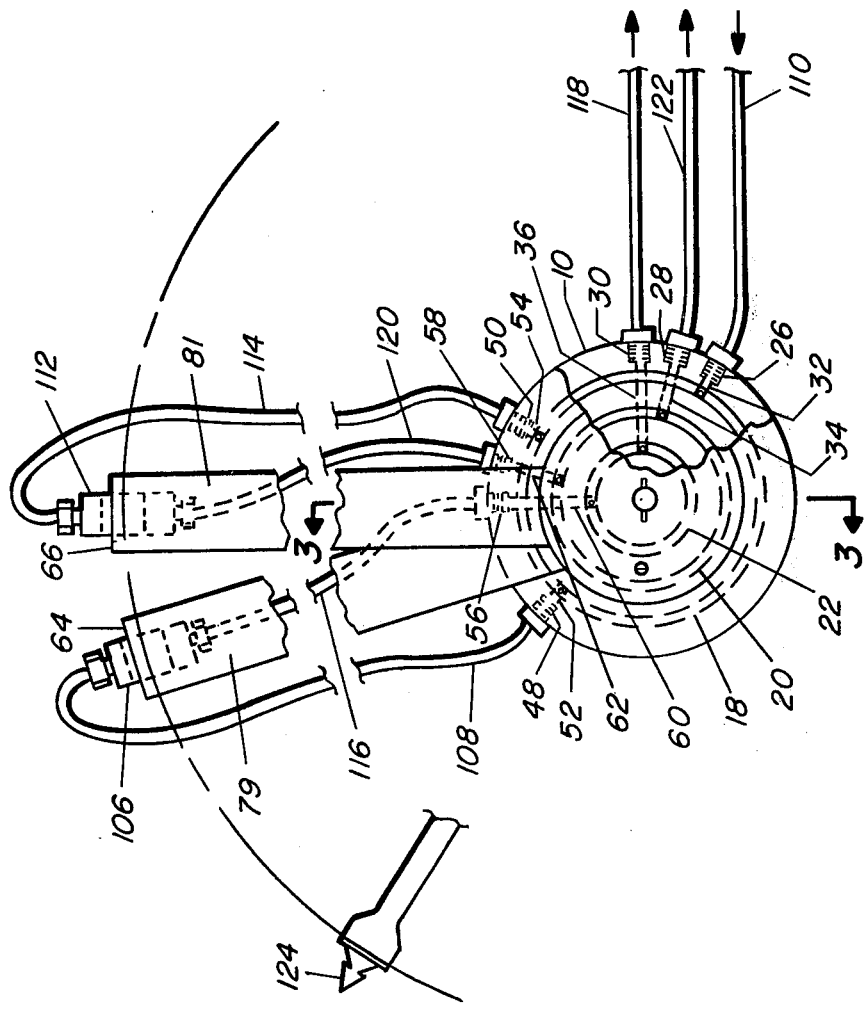

PNEUMATIC TRANSFER SWITCH FOR BATCH WEIGHING

GOVERNMENTAL INTEREST

The invention described herein was made in the course of a contract with the Government and may be manufactured, used and licensed by or for the Government for governmental purposes without the payment to me of any royalty thereon.

BACKGROUND OF THE INVENTION

Various means have been used by prior art automatic limit stop scales to provide a means for adjusting variable cut-off points. Prior art scale devices frequently utilize pneumatic sensors which are generally connected to pneumatic supply and signal lines by means of flexible tubing. Normally when the prior art cut-off sensors were moved around the periphery of a scale in order to set a cut-off weight point, the flexible lines frequently became entangled with the protruding features of the scale, and particularly with the center stem of the weighing device. Usually if the sensors were moved too far in one direction, without reversing the direction, the pneumatic lines would be pulled loose from their connections, resulting in a loss of signal and operability. The prior art devices were frequently forced to rely solely on the caution of the operator in adjusting the limiting sensors in order to prevent interruption of the pneumatic signal because of broken or tangled pneumatic hoses. The aforementioned prior art devices were generally a problem because extra time was required in setting up the cut-off points on the pneumatic sensor elements, and usually extra time was required for service calls to repair hoses which resulted in turn in lost production.

SUMMARY OF THE INVENTION

The present invention relates to a pneumatic transfer switch which is used to variably set and automatically control the cut-off weight of a material being measured in a batching operation.

The present invention utilizes a pneumatic transfer switch device which provides a movable disc slidably and rotatably held in axial alignment with a stationary disc for the purpose of facilitating the transferral of pneumatic signals from sensors which are rotatably attached to the movable disc by rigid pneumatic hose connections. The movable disc which is pneumatically and slidably fitted to the stationary disc permits the sensors to be rotated repeatedly about a scale face without danger of pinching the sensor pneumatic lines or pulling them loose from their connections. The present invention permits the use of only one pneumatic supply line for servicing a plurality of pneumatic sensors. The air source and sensor output ports are stationary, being fixedly attached to the face of the scale. The movable disc with its rotatably attached sensor supports is in axial alignment with the pointer shaft of the scale and is used to set a desired batching weight on any point on the scale face.

An object of the present invention is to provide a pneumatic transfer switch for an automatic weighing scale which will enable variable positioning of a pneumatic detection system without requiring the use of flexible pneumatic lines.

Another object of the present invention is to provide a pneumatic transfer switch for a scale which permits variable positioning of a pneumatic detection system to any cut-off point on the scale without incurring the danger of pinching pneumatic lines or of pulling pneumatic lines loose from their connections.

Another object of the present invention is to provide a pneumatic transfer switch for a scale which permits variable positioning of pneumatic sensors using only one pneumatic supply line for servicing a plurality of pneumatic sensors.

A further object of the present invention is to provide a pneumatic transfer switch which allows for variable positioning of a pneumatic detection system on a scale in order to set automatic cut-off points where the reliability of the device is not dependent upon the caution which an operator uses in respositioning pneumatic lines.

For a better understanding of the present invention, together with other and further objects thereof, reference is made to the following descriptions taken in connection with the accompanying drawings.

BRIEF DESCRIPTION OF THE DRAWINGS

FIG. 2 is a partial cutaway plan view of the pneumatic transfer switch taken along line 2—2 of FIG. 1.

FIG. 3 is a partial cross-sectional view of the pneumatic transfer switch taken along line 3—3 of FIG. 2.

Throughout the following description like reference numerals are used to denote like parts of the drawings.

DESCRIPTION OF THE PREFERED EMBODIMENTS

Figure 1:
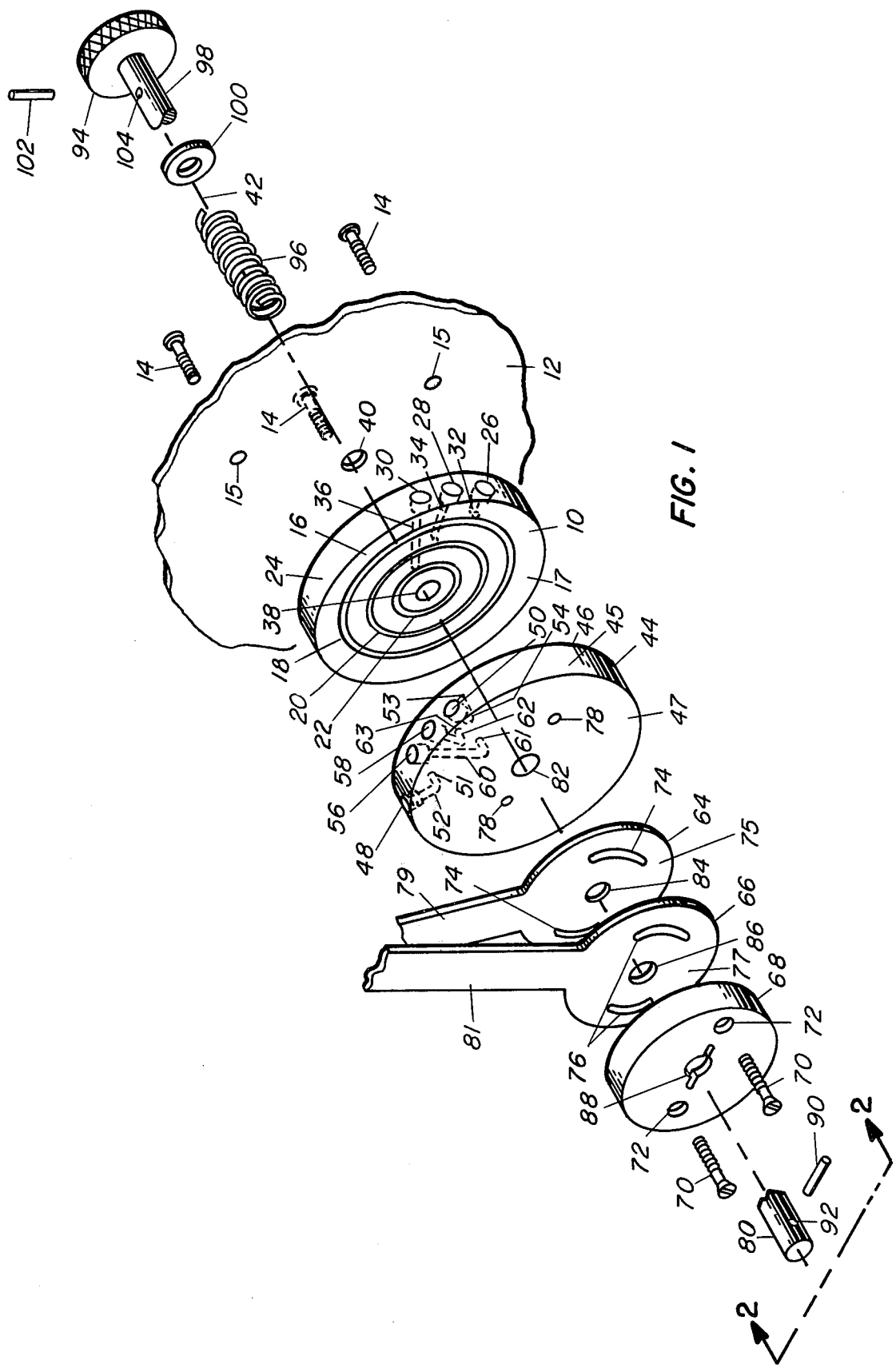
FIG. 1 is an exploded isometric view of the pneumatic transfer switch.

Referring now to FIGS. 1 and 3 the pneumatic transfer switch has a stationary disc shaped member 10 which is fixedly attached to a scale cover or housing 12 by means of screws 14 which pass through housing holes 15 into threaded holes 13 of the rear face 11. Stationary disc 10 has a ground forward face 16 which has a thin lubricating material 17 thereon as indicated in FIG. 1 and three annular axially positioned pneumatic grooves, a first groove 18 of largest size, an intermediate size second groove 20 and a smaller third groove 22 therein. The peripheral edge 24 of stationary disc 10 has disposed therein three radially positioned stationary disc connection threaded bores. A first input connection threaded bore 26, a second output threaded connection bore 28 and a third output threaded connection bore 30 pneumatically communicate with grooves 18, 20 and 22 respectively through drilled stationary disc "L" shaped first, second and third air passageways 32, 34 and 36 respectively. Stationary disc 10 has a centrally disposed shaft clearance hole 38 therein which is in axial alignment with a scale cover shaft hole or housing clearance hole 40 and the longitudinal shaft axis 42 of the pneumatic transfer switch. A movable disc 44 is in axial alignment with stationary disc 10 and has a ground face 46 held biasedly in slidable contact with the ground forward face 16 of stationary disc 10. Movable disc 44 has first and second threaded bores 48 and 50 respectively located in peripheral surface 45. Movable disc threaded disc bores 48 and 50 communicate through L shaped first and second movable disc passageways 52 and 54 respectively through exit orifices 51 and 53 with first annular groove 18 when the ground face 46 of movable disc 44 is in abutment with stationary disc ground forward face 16. Third and fourth movable disc threaded bores 56 and 58 respectively also located in the peripheral surface 45 communicate with annular grooves 20 and 22 respectively through movable disc third and fourth drilled passageways 60 and 62 through exit orifices 61 and 63 respectively. First and second paddle shaped sensor support members 64 and 66 respectively are rotatably held attached as an assembly to movable disc 44 by support disc 68, by screws 70 which partially pass through screw clearance holes 72 in support disc 68, then in turn throgh arcuate slots 74 and 76 concentrically located in the first and second circular sections 75 and 77 respectively, of the paddle shaped sensor support members 64 and 66 respectively, so that the screws 70 may be threadedly attached to the axially aligned movable disc threaded screw holes 78 located in the rear face 47 of movable disc 44. The movable disc assembly is biasedly rotatably held against the stationary disc 10 so that the movable disc ground forward face 46 is in intimate contact with the stationary disc ground forward face 16 by a pinned shaft 80. Shaft 80 slidably fits through housing clearance hole 40, stationary disc shaft clearance hole 38, an axially positioned movable disc shaft clearance hole 82, sensor support members 64 and 66 axially disposed shaft clearance holes 84 and 86 respectively, and through a partially slotted axially positioned support disc shaft hole 88 disposed in support disc 68. A rear shaft pin 90, which is fixedly positioned in a transversely positioned rear shaft pin hole 92 fits into the slotted shaft hole 88. The pinned shaft 80 causes the support disc 68 and the affixed movable disc assembly to rotate about the longitudinal axis 42 when a torque is applied to integral axially positioned shaft knob 94. A helical spring 96 is biasedly positioned on the front end 98 of shaft 80 intermediate housing 12 and a washer 100 and front shaft pin 102 which fits into a transversely positioned front shaft pin hole 104.

Referring now to FIGS 1–3 the handle section 79 of first sensor support member 64 has a "dribble feed" fluidic sensor 106 fixedly attached thereto. A rigid "dribble feed" sensor pneumatic input line 108 threadedly attached to movable first threaded bore 48 pneumatically connects the input of the "dribble feed" sensor 106 via connection bore 26, stationary disc first passageway 32, first annular groove 18, and first movable disc L-shaped passageway 52. A "stop feed" fluidic sensor 112 is fixedly attached to the handle section 81 of the second sensor support member 66 and has a threadedly attached rigid pneumatic input line 114 which is threadedly attached to movable disc second threaded bore 50. The "stop feed" fluidic sensor 112 is also pneumatically connected to the stationary air supply line 110 via drilled passageway 32, the first annular groove 18, and by drilled passageway 54. The pneumatic output of the "dribble feed" sensor 106 is pneumatically connected by a non-flexible pneumatic "dribble feed" sensor output line 116 to a first stationary fluidic signal output line 118 at connection bore 30 via the third annular groove 22, the third stationary disc L-shaped passageway 36, third movable disc passageway 60 and the third movable disc threaded bore 56. In a similar fashion to the pneumatic output connections for the "dribble feed" sensor 106, "stop feed" fluidic sensor 112 is pneumatically connected by a "stop feed" sensor nonflexible pneumatic output line 120 to a second fluidic signal output line 122 at connection bore 28 via stationary disc drilled passageway 34, second annular groove 20, and the fourth drilled passageway 62 of the movable disc 44.

In operation the pneumatic transfer switch assembly is mounted on the scale housing 12 with the movable disc 44 set to a desired batching weight. The "dribble feed" sensor 106 is positioned by loosening screws 70 and rotating first support member 64, with respect to the second support member 66, about shaft 80 and then retightening screws 70 when the desirable amouht of gap between the "dribble feed" and "stop feed" sensors 106 and 112 respectively, have been obtained. A paddle member 124, which is attached to and rotates with the scale indicator shaft, is used to activate sensors 106 and 112. When the paddle 124 passes in front of the "dribble feed" sensor 106, the interruption of an air stream emanating therefrom causes the "dribble feed" sensor to become actuated and to send a pneumatic output signal therefrom to the first fluidic signal output line 118. The first output signal is used to slow down a filling operation, not shown, supplying material to the batch being weighed. When the interrupter paddle 124 passes in front of "stop feed" sensor 112, a pneumatic output signal is generated by sensor 112 which causes the filling operation to automatically stop. A pneumatic sensor, such as the Norgen Fluidic Sensor, Model 4JF020D00, as manufactured by Norgen of 400 South Delaware St., Littleton, Colorado, may be used to detect the passage of an interrupter paddle 124 in an application similar to the one aforedescribed.

While there has been described and illustrated specific embodiments of the invention, it will be obvious that various changes, modifications and additions can be made herein without departing from the field of the invention which should be limited only by the scope of the appended claims.

Having thus fully described the invention, what is claimed as new and desired to be secured by Letters Patent of the United States is:

1. A pneumatic transfer switch for variably setting and automatically controlling cut-off weight points on a scale for material being measured in a batching operation which comprises:

a stationary disc having a ground forward face, a rear face and a peripheral edge, said forward face having a plurality of annular axially positioned grooves therein and a centrally disposed axially aligned shaft clearance hole therethrough, said rear face of said stationary disc being fixedly attached to a housing member of said scale, said peripheral edge having a plurality of radially positioned output connection threaded bores therein and an input threaded connection bore, said connection threaded bores communicating with said annular grooves through L-shaped drilled air passageways, said output connection threaded bores providing connections for a pneumatic air supply and for a plurality of pneumatic output signals;

pneumatic sensor means for detecting the interruption of an air stream and for generating pneumatic output signals in response thereto;

rotating pneumatic means, axially aligned and biasedly held in slidable contact with said stationary disc, for respositioning said sensor means with respect to said cut-off weight points on said scale and for maintaining a continuous pneumatic supply flow to said sensor means, and for carrying pneumatic output signals from said sensor means to said stationary disc to control said batching operation;

rigid pneumatic lines pneumatically connected intermediate said sensor means and said rotating pneumatic means; and pneumatic lubricating material operatively disposed intermediate said rotating pneumatic means and the ground forward face of said stationary disc, said lubricating material providing pneumatic sealing between said rotating pneumatic means and said staionary disc means.

2. A pneumatic transfer switch as recited in claim 1 wherein said rotating pneumatic means comprises:
a movable disc member having a forward ground face, a rear face, and a peripheral edge, said movable disc having a plurality of drilled L-shaped holes therein having exiting orifices which pneumatically communicate with the annular grooves of said stationary disc, said peripheral edge having a plurality of radially disposed connection threaded bores therein each of which pneumatically communicate with one of said L-shaped holes, said rear face having threaded screw holes therein, and said movable disc having a centrally disposed axially aligned shaft clearance hole therethrough;
a support disc member having an axially positioned slotted shaft hole and a plurality of screw holes therethrough, said screw holes being in axial alignment with the threaded screw holes in said rear face of said movable disc member, said support disc member being screwedly affixed to said movable disc member.
sensor support means for positioning said pneumatic sensor means with respect to said cut-off weight points on said scale;
screw means, slidably passing through said support disc member and said sensor support means, for holding said sensor support means fixedly to said movable disc after said sensor support means has positioned said pneumatic sensor means to said cut-off weight points;
shaft means, operatively affixed to said rotating pneumatic means, for repositioning said sensor means with respect to said cut-off weight points on said scale and for maintaining a biasing force intermediate the ground forward faces of said movable disc and said stationary disc.

3. A pneumatic transfer switch as recited in claim 1 wherein said pneumatic sensor means comprises:
a first fluidic sensor pneumatically connected to said rotating pneumatic means and to said sensor support means; and
a second fluidic sensor pneumatically connected to said rotating pneumatic means and to said sensor support means so that there is a gap between said first and second fluidic sensors, said first sensor being set at a "dribble feed" scale cut-off point and said second sensor being set at a "stop feed" scale cut-off point.

4. A pneumatic transfer switch as recited in claim 2 wherein said sensor support means comprises:
a first paddle shaped sensor support member having a handle section and a circular section integral therewith, said circular section having a plurality of arcuate slots and an axial shaft bore therethrough, said first sensor support member having said circular section in abutment with said support disc;
a second paddle shaped sensor support member having a handle section and a circular section integral therewith, said ciruclar section of said second paddle shaped sensor support member having a plurality of arcuate slots and an axial shaft bore therethrough, said slots of each of said first and second paddel sensor supports being radially aligned with each other and in axial alignment with the screw hole of said support disc member and the threaded screw holes in said rear face of said movable disc member, said second paddle shaped member being positioned intermediate said first paddle shaped sensor support member and said rear face of said movable disc member, said handle section of said first sensor support member fixedly holding said first fluidic sensor and said handle section of said second sensor support member fixedly holding said second fluidic sensor.

5. A pneumatic transfer switch as recited in claim 2 whereinsaid shaft means comprises:
a shaft having a transversely positioned front and rear shaft pin holes therethrough and an integral axially positioned knob located on the shaft front end, said shaft slidably passing through said shaft clearance holes of said stationary disc, through said movable disc member, through said first and second sensor support member axial shaft bore, and through said slotted shaft hole of said support disc member; operatively disposed to engage said slotted shaft hole of said support disc member;
a front shaft pin fixedly positioned in said front shaft pin hole;
a washer positioned on said shaft, said washer having one face in contact with said front shaft pin; and
a helical spring operatively disposed on said shaft intermediate said washer and said housing member of said scale, said spring providing a biasing force to hold said rotating pneumatic means against said stationary disc to pneumatically transfer input air supply to and output signals from said first and second fluidic sensors.

* * * * *